(12) United States Patent
Robinson et al.

(10) Patent No.: US 10,291,603 B2
(45) Date of Patent: May 14, 2019

(54) REGISTERING A SMART DEVICE WITH A REGISTRATION DEVICE USING A MULTICAST PROTOCOL

(71) Applicant: Verizon Patent and Licensing Inc., Arlington, VA (US)

(72) Inventors: Quentin N. Robinson, Willingboro, NJ (US); Gabor Illes, Basking Ridge, NJ (US); Shamik Basu, Lake Hiawatha, NJ (US); Erwin S. Levy, Washington, NJ (US); Mahadevan Viswanathan, Summit, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 366 days.

(21) Appl. No.: 15/092,731

(22) Filed: Apr. 7, 2016

(65) Prior Publication Data
US 2017/0295167 A1 Oct. 12, 2017

(51) Int. Cl.
*H04L 9/32* (2006.01)
*H04W 4/08* (2009.01)
*H04W 4/70* (2018.01)
*G06F 21/44* (2013.01)
*G06F 21/73* (2013.01)
(Continued)

(52) U.S. Cl.
CPC ......... *H04L 63/0823* (2013.01); *G06F 21/44* (2013.01); *G06F 21/73* (2013.01); *H04L 9/3213* (2013.01); *H04L 9/3263* (2013.01); *H04L 12/185* (2013.01); *H04L 12/189* (2013.01); *H04L 63/0876* (2013.01); *H04L 63/0884* (2013.01); *H04W 4/70* (2018.02); *H04W 12/04* (2013.01); *H04L 63/0861* (2013.01); *H04W 4/08* (2013.01); *H04W 12/06* (2013.01)

(58) Field of Classification Search
CPC ............. H04L 63/0823; H04L 63/0876; H04L 63/0884; H04W 12/04; H04W 12/06; H04W 4/08; H04W 4/70
See application file for complete search history.

(56) References Cited

U.S. PATENT DOCUMENTS

| 5,600,635 | A | * | 2/1997 | Hamaki | ............... | H04W 72/005 |
| | | | | | | 370/280 |
| 7,075,904 | B1 | * | 7/2006 | Manish | ............... | H04L 12/1886 |
| | | | | | | 370/312 |

(Continued)

OTHER PUBLICATIONS

Dierks et al. "The Transport Layer Security (TLS) Protocol Version 1.2," https://www.ietf.org/rfc/rfc5246.txt, Aug. 2008, 104 pages.

*Primary Examiner* — Sharon S Lynch

(57) ABSTRACT

A device may transmit, to a first device, a first point-to-multipoint message to determine whether to request security information. The security information may be associated with permitting the first device to register with a registration device. The device may receive, from the first device, a point-to-multipoint response that includes first device information associated with connecting to the first device. The device may transmit, to the first device, a second point-to-multipoint message based on the first device information. The device may request and receive the security information from the registration device. The device may provide the security information to the first device to permit the first device to register with the registration device.

20 Claims, 10 Drawing Sheets

(51) Int. Cl.
*H04L 12/18* (2006.01)
*H04L 29/06* (2006.01)
*H04W 12/04* (2009.01)
*H04W 12/06* (2009.01)

(56) References Cited

U.S. PATENT DOCUMENTS

| | | | | |
|---|---|---|---|---|
| 9,451,462 | B2* | 9/2016 | Kim | H04L 63/0876 |
| 2005/0008159 | A1* | 1/2005 | Grilli | H04L 12/189 |
| | | | | 380/270 |
| 2005/0015583 | A1* | 1/2005 | Sarkkinen | H04L 12/1859 |
| | | | | 713/150 |
| 2006/0040655 | A1* | 2/2006 | Kim | H04W 76/40 |
| | | | | 455/426.1 |
| 2007/0183434 | A1* | 8/2007 | Pandey | H04W 4/06 |
| | | | | 370/401 |
| 2007/0286121 | A1* | 12/2007 | Kolakowski | H04L 29/06027 |
| | | | | 370/329 |
| 2008/0119166 | A1* | 5/2008 | Zhu | H04W 12/06 |
| | | | | 455/411 |
| 2009/0282246 | A1* | 11/2009 | Gunther | H04L 63/062 |
| | | | | 713/168 |
| 2010/0039978 | A1* | 2/2010 | Rangan | H04L 12/189 |
| | | | | 370/312 |
| 2010/0315972 | A1* | 12/2010 | Plotnik | H04L 67/16 |
| | | | | 370/254 |
| 2010/0315985 | A1* | 12/2010 | Moon | H04L 63/08 |
| | | | | 370/312 |
| 2011/0159799 | A1* | 6/2011 | Chen | H04L 1/1867 |
| | | | | 455/3.01 |
| 2011/0289562 | A1* | 11/2011 | Pang | H04L 63/062 |
| | | | | 726/4 |
| 2013/0003972 | A1* | 1/2013 | Kang | H04W 12/04 |
| | | | | 380/270 |
| 2014/0032697 | A1* | 1/2014 | Shapiro | G06F 15/17331 |
| | | | | 709/212 |
| 2014/0098247 | A1* | 4/2014 | Rao | H04W 4/20 |
| | | | | 348/207.1 |
| 2014/0369232 | A1* | 12/2014 | Kim | H04W 60/00 |
| | | | | 370/254 |
| 2015/0156742 | A1* | 6/2015 | Morad | H04W 24/06 |
| | | | | 455/435.1 |
| 2016/0044032 | A1* | 2/2016 | Kim | H04L 63/0876 |
| | | | | 726/5 |
| 2016/0248746 | A1* | 8/2016 | James | H04W 4/70 |

* cited by examiner

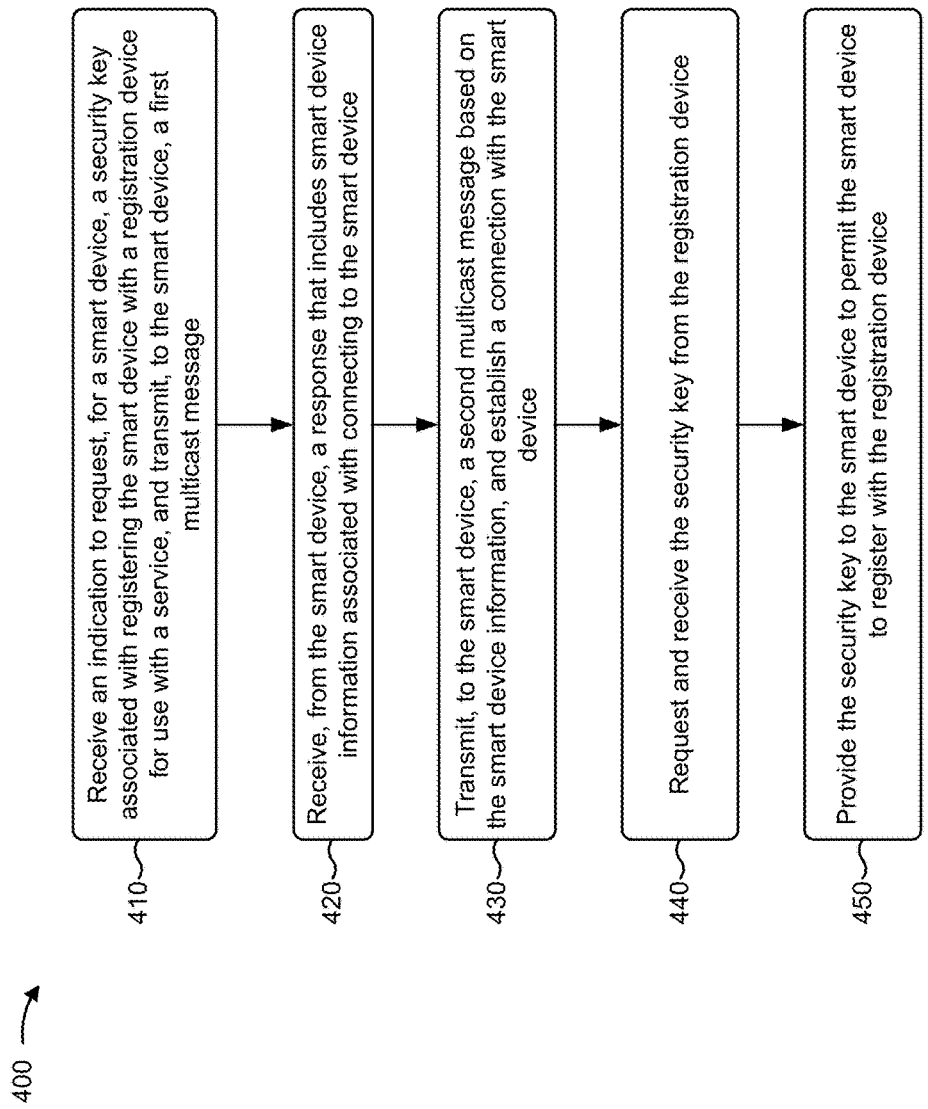

REGISTERING A SMART DEVICE WITH A REGISTRATION DEVICE USING A MULTICAST PROTOCOL

BACKGROUND

A user device may send a multicast communication via a network. The multicast communication may include a group communication, such as a one-to-many communication or a many-to-many communication. In some cases, when sending the multicast communication, the user device may transmit the multicast communication to a group of destination devices (e.g., by using a multicast Internet protocol (IP) address). The user device may use one or more communication protocols to transmit the multicast communication to the group of destination devices. For example, the user device may use user datagram protocol (UDP) or transmission control protocol (TCP) to transmit multicast communication.

BRIEF DESCRIPTION OF THE DRAWINGS

FIG. 4 is a flow chart of an example process for registering a smart device with a registration device using a multicast protocol.

DETAILED DESCRIPTION OF PREFERRED EMBODIMENTS

Figure 1A:
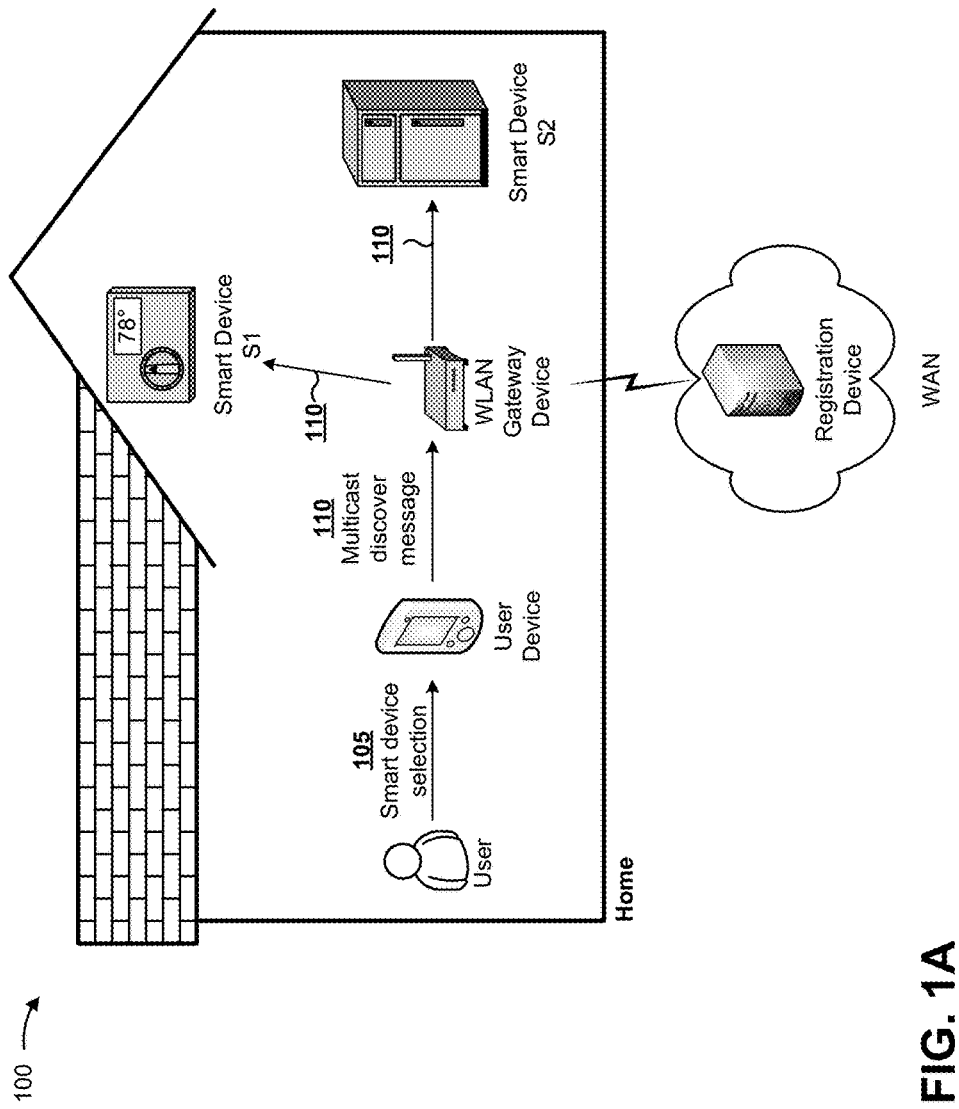
FIGS. 1A-1E are diagrams of an overview of an example implementation described herein.

The following detailed description of example implementations refers to the accompanying drawings. The same reference numbers in different drawings may identify the same or similar elements.

An occupant of a house, an apartment, or an office building (e.g., a homeowner or a tenant) may want to register smart devices for use in the occupant's building. For example, the smart devices may include electronic devices capable of connecting to other devices and/or networks, such as a smart thermostat, a smart light switch, a smart power outlet, a smart fire, smoke, or gas detector, a smart component of a security system, or a smart appliance. In some cases, the occupant may want to connect the smart devices to a wide area network (WAN), such as a long term evolution (LTE) network. For example, the occupant may want to connect the smart device to the WAN to use smart device services and/or other services associated with the WAN, such as remote access services and/or other services that permit the occupant to control the smart devices via a user device (e.g., a computer or a smartphone). When registering a smart device, the occupant may download and use an application (e.g., an application installed on the user device, executing on the user device, or executed remotely by the user device) to connect the smart device to the WAN.

In some cases, the occupant may register multiple smart devices on a local area network (e.g., in the occupant's home or workplace). To register the multiple smart devices, the occupant may have to download and use multiple different applications, such as different applications for different smart devices, different applications for different brands and/or manufacturers of different smart devices, or the like. This consumes significant memory resources of the user device by storing multiple applications. In addition, this consumes significant time resources of the user by forcing the user to download and use multiple applications to connect the multiple smart devices to the WAN.

Further, the smart device may lack security software and/or security features associated with authenticating the smart device when connecting the smart device to the external network (e.g., because of limited memory resources of the smart device or a particular configuration of the smart device). This prevents the occupant from authenticating the smart device when connecting the smart device to the WAN, thereby reducing the security of connecting the smart device to the WAN.

Implementations described herein enable a user of a user device to register a smart device with a registration device using a point-to-multipoint protocol (e.g., a multicast protocol or a broadcast protocol). In this way, the user may use a single application to register multiple smart devices, associated with multiple brands and/or manufacturers, with the registration device to enable a service provider to provide uniform services to the multiple smart devices and/or to enable the user to control the multiple smart devices using a single application. This conserves computing and/or memory resources of the user device by reducing and/or eliminating the need for the user of the user device to download, store, and execute the multiple applications when connecting multiple smart devices. In addition, this conserves time resources of the user by reducing and/or eliminating the need for the user to download and/or use multiple applications to connect the multiple smart devices to the external network. Further, implementations described herein enable the user device to connect the smart device to a registration device using a security key and/or authentication information. This increases security when connecting the smart device to the external network by enabling a registration device associated with the external network to authenticate the smart device.

FIGS. 1A-1E are diagrams of an overview of an example implementation 100 described herein. As shown in FIG. 1A, a user of a user device (e.g., an occupant of a home, an apartment, or an office building) may want to connect a smart device S1, such as a smart thermostat, to a WAN. For example, the user may want to connect smart device S1 to the WAN to use one or more services provided via the WAN, such as remote access services, that permit the user to control smart device S1 via the user device, and/or other services.

As shown by reference number 105, the user may select, via a user interface of the user device, smart device S1 for registration with a registration device. As shown by reference number 110, the user device may transmit a multicast discover message to all smart devices in communication with a WLAN gateway device, including smart device S1 and smart device S2, based on receiving the user selection. Alternatively, the user device may transmit the multicast discover message directly to all smart devices in communication with the user device (e.g., via device-to-device communications).

Figure 1B:
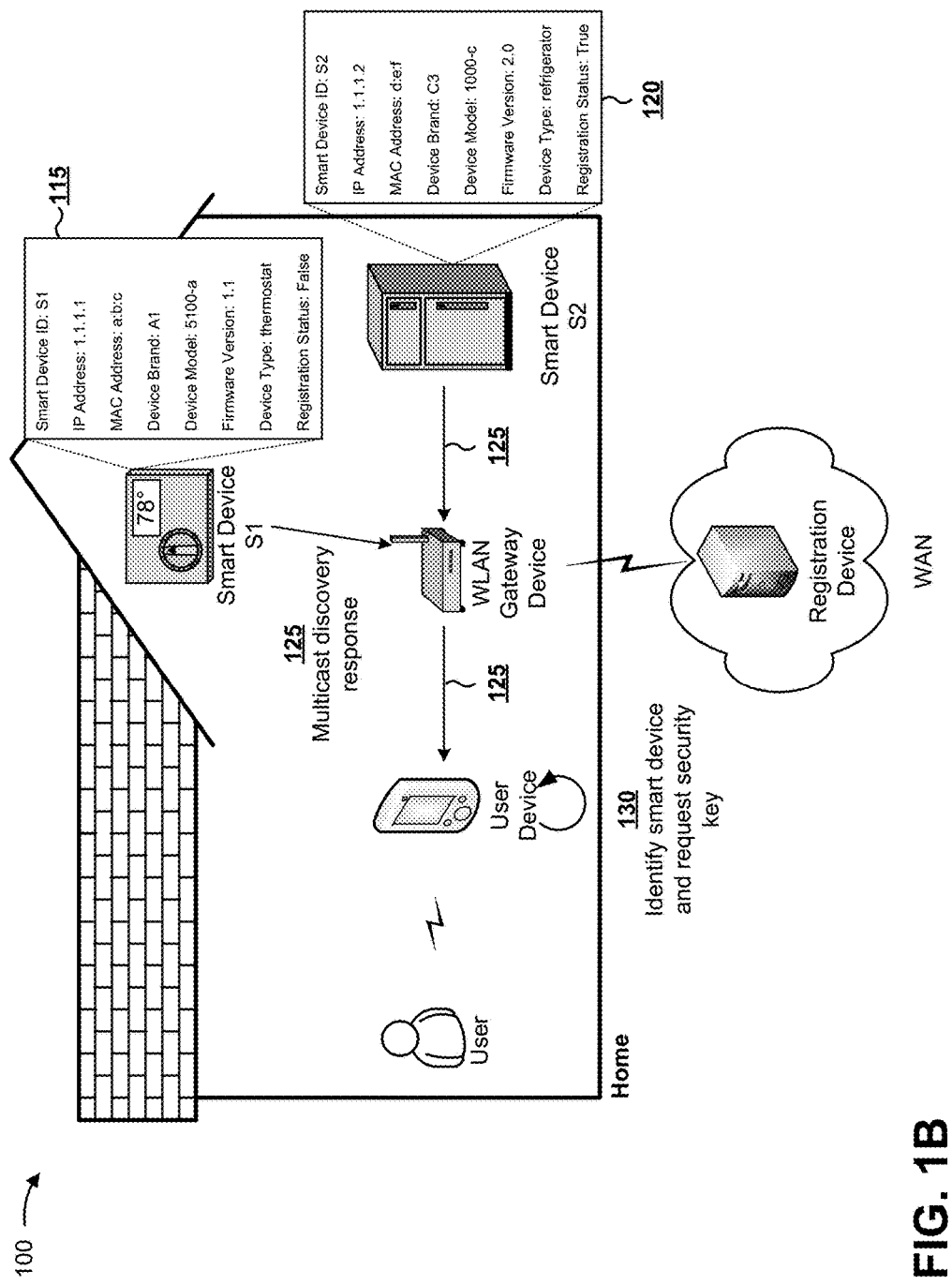

As shown in FIG. 1B, and by reference number 115, smart device S1 may store first smart device information associated with identifying and/or connecting to smart device S1. For example, the smart device information may include a smart device identifier of "S1," an Internet protocol (IP) address of "1.1.1.1," a media access control (MAC) address of "a:b:c," a device brand of "A1," a device model of "5100-a," a firmware version of "1.1," a device type of "thermostat," and/or a registration status of smart device S1 (e.g., shown as "Registration Status: False," indicating that smart device S1 is not registered with the registration device).

As shown by reference number 120, smart device S2 may store second smart device information associated with identifying and/or connecting to smart device S2. For example, the second smart device information may include a smart device identifier of "S2," an IP address of "1.1.1.2," a MAC address of "d:e:f," a device brand of "C3," a device model of "1000-c," a firmware version of "2.0," a device type of "refrigerator," and/or a registration status of smart device S2 (e.g., shown as "Registration Status: True," indicating that smart device S2 is registered with the registration device).

As shown by reference number 125, smart device S1 and smart device S2 may transmit multicast discover responses to the user device based on receiving the multicast discover message from the user device. Smart device S1 and smart device S2 may provide the first and second smart device information to the user device in association with transmitting the multicast discover response. Smart devices S1 and S2 may provide the first and the second smart device information to the user device so that the user device may determine whether to request a security key for one or both of smart devices S1 and S2 (e.g., based on the registration status of smart devices S1 and S2). In addition, the user device may use the first and/or second smart device information to connect to smart device S1 and/or S2 and to provide the security keys (if requested) to smart devices S1 and/or S2.

As shown by reference number 130, the user device may identify smart device S1 as a smart device that is not registered with the registration device based on the registration status of smart device S1 (e.g., "Registration Status: False"). When the user device identifies smart device S1 as a smart device that is not registered with the registration device, the user device may request a security key for smart device S1, which smart device S1 may use to register with the registration device, as described below.

In addition, the user device may identify user device S2 as a smart device that is registered with the registration device based on the registration status of smart device S2 (e.g., "Registration Status: True"). When the user device identifies smart device S2 as a smart device that is registered with the registration device, the user device may not request a security key for smart device S2, because smart device S2 has been previously registered with the registration device.

Figure 1C:
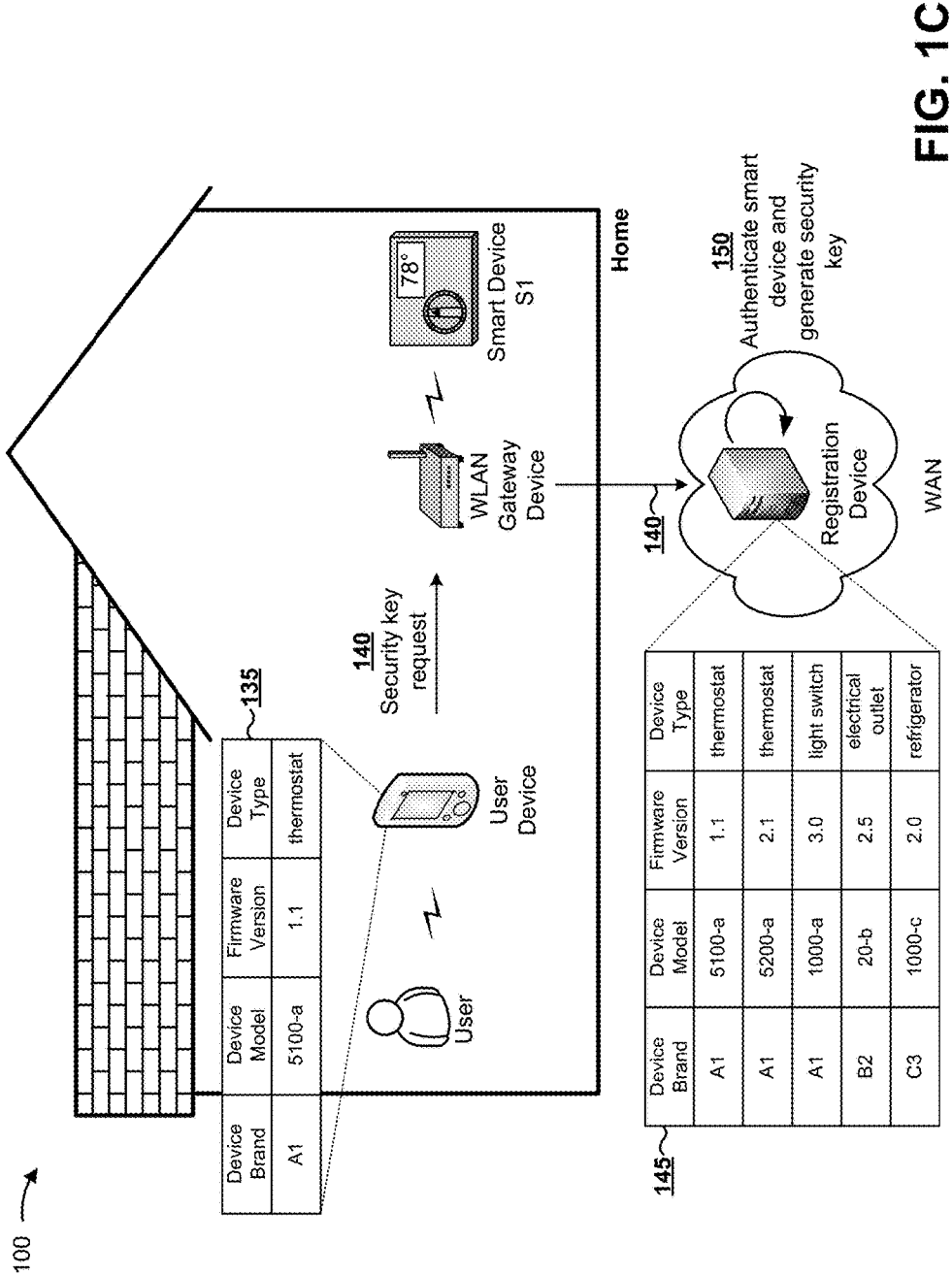

As shown in FIG. 1C, and by reference number 135, the user device may store authentication information associated with authenticating smart device S1. The authentication information may include the first smart device information received from smart device S1. For example, the authentication information may include the device brand of smart device S1, the device model of smart device S1, the firmware version of smart device S1, and/or the device type of smart device S1. As shown by reference number 140, the user device may transmit a security key request to the registration device (e.g., via the WLAN gateway device). The user device may transmit the authentication information to the registration device, in association with transmitting the security key request, for authentication of smart device S1. In some implementations, the user device may transmit an application certificate (e.g., a security identifier, a security token, or a digital certificate) to the registration device. For example, the application certificate may be associated with authenticating the user device and/or the application via which the user selected smart device S1, thereby increasing security of registering smart device S1 with the registration device by authenticating the user device and/or the application requesting the security key for smart device S1.

As shown by reference number 145, the registration device may store a set of authentication information associated with smart devices, such as device brands of the smart devices, device models of the smart devices, firmware versions of the smart devices, and/or device types of the smart devices. For example, the set of authentication information may include: smart device brands "A1," "B2," and "C3"; smart device models "5100-a," "5200-a," "1000-a," "20-b," and "1000-c"; smart device firmware versions "1.1," "2.1," "3.0," "2.5," and "2.0"; and smart device types "thermostat," "light switch," "electrical outlet," and "refrigerator."

As shown by reference number 150, the registration device may authenticate smart device S1 and generate the security key. For example, the registration device may authenticate smart device S1 by comparing the authentication information, received from the user device, and the set of authentication information stored by the registration device. When the comparison indicates a match, the registration device may authenticate smart device S1 and generate the security key.

Figure 1D:
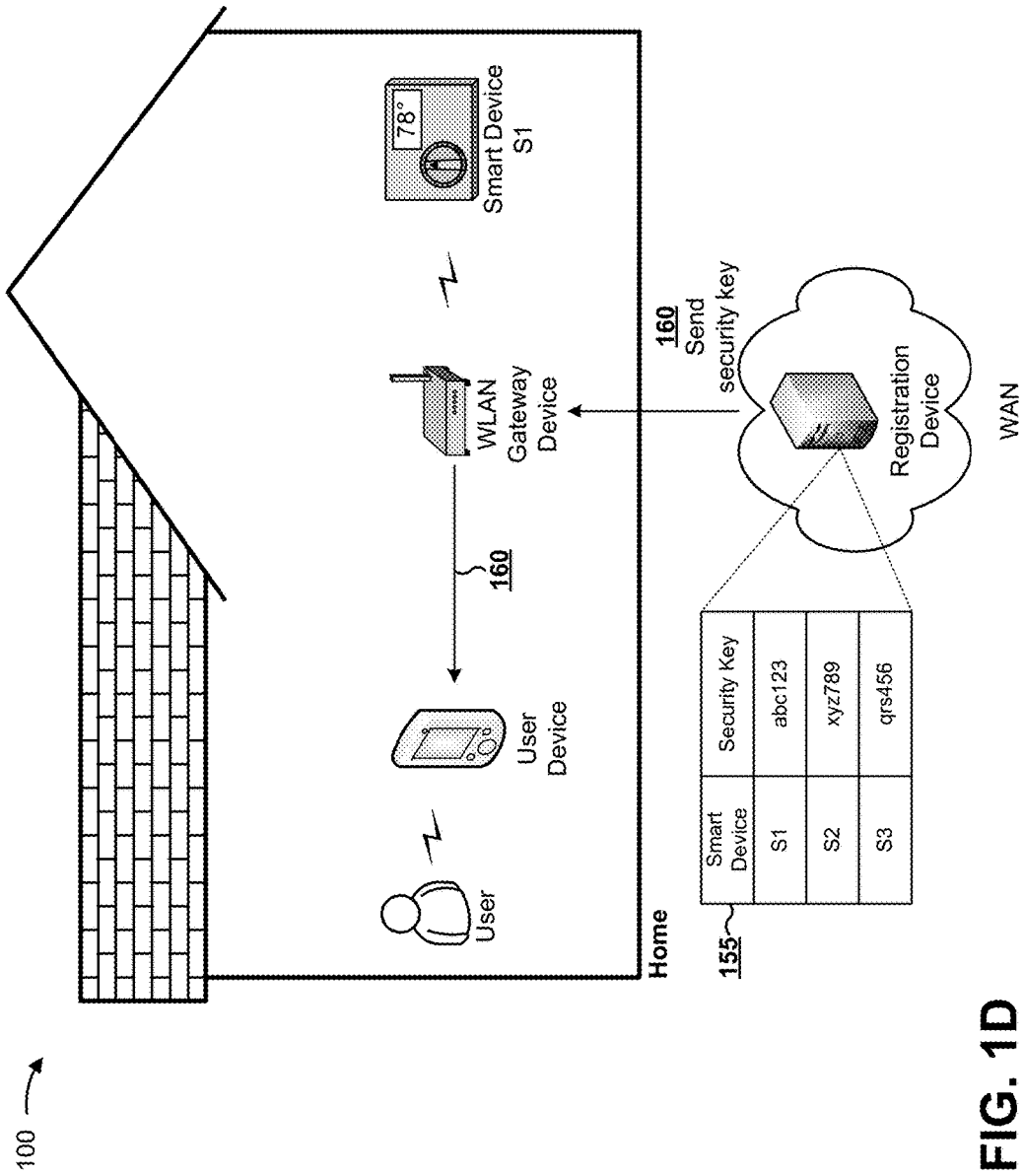

As shown in FIG. 1D, and by reference number 155, the registration device may store smart device identifiers (e.g., shown as "S1," "S2," and "S3") and corresponding security keys (e.g., shown as "abc123," "xyz789," and "qrs456"). For example, the registration device may store the smart device identifiers and corresponding security keys in association with authenticating smart devices and generating the security keys for the smart devices. The registration device may use the stored security key to authenticate a registration request from smart device S1, as described below. As shown by reference number 160, the registration device may send the security key, associated with smart device S1, to the user device (e.g., via the WLAN gateway device).

Figure 1E:
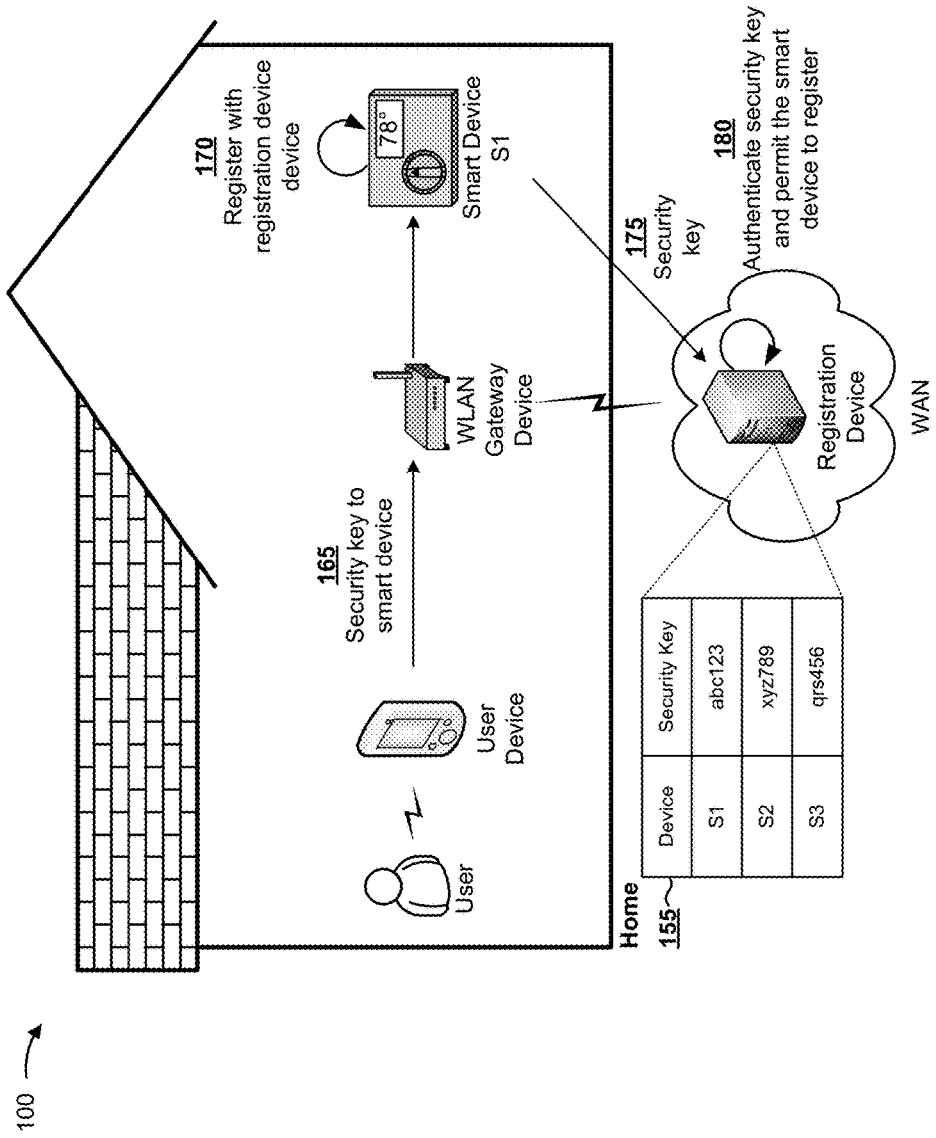

As shown in FIG. 1E, and by reference number 165, the user device may provide the security key to smart device S1 to permit smart device S1 to register with the registration device. In some implementations, when the user device provides the security key to smart device S1, the user device may provide additional connection information (e.g., connection credentials, account credentials, or network credentials, such as usernames and/or passwords), associated with connecting to the WAN, which smart device S1 may use to connect to the WAN.

As shown by reference number 170, smart device S1 may register with the registration device using the registration information and the security key. As shown by reference number 175, smart device S1 may register with the registration device by providing the security key to the registration device for authentication. In some implementations, smart device S1 may provide the connection information to the registration device and/or a different device in association with connecting to the WAN.

As shown by reference number 180, the registration device may authenticate the security key received from smart device S1 and permit smart device S1 to register with the registration device. For example, the registration device may compare the security key and a set of stored security keys to determine whether the security key received from smart device S1 is the security key generated for smart device S1. In some implementations, when the comparison indicates a match, the registration device may permit smart device S1 to register with the registration device. Once registered with the registration device, smart device S1 may have access to one or more services associated with the WAN.

In this way, a user device may use a multicast protocol to register multiple smart devices with a registration device (e.g., regardless of a brand and/or a manufacturer of the smart devices). This may enable a user of the user device to use a single application associated with the user device to register the multiple smart devices, control the multiple smart devices, and/or access services. This conserves computing and/or memory resources of the user device by enabling a user of the user device to avoid downloading and using multiple applications to register multiple smart devices, associated with multiple brands and/or manufacturers, with the registration device. In addition, this may enable a single service provider to provide uniform services to the multiple smart devices (e.g., rather than multiple service providers, associated with different brands and/or manufacturers, providing different services to the multiple devices), which increases an efficiency of providing services to multiple smart devices associated with different brands and/or manufacturers.

Further, the user device may register the smart device with the registration device using a security key. This increases security of registering the smart device with the registration device by enabling authentication of the smart device, such as when the smart device does not have security software and/or security features.

As indicated above, FIGS. 1A-1E are provided merely as an example. Other examples are possible and may differ from what was described with regard to FIGS. 1A-1E.

Figure 2:
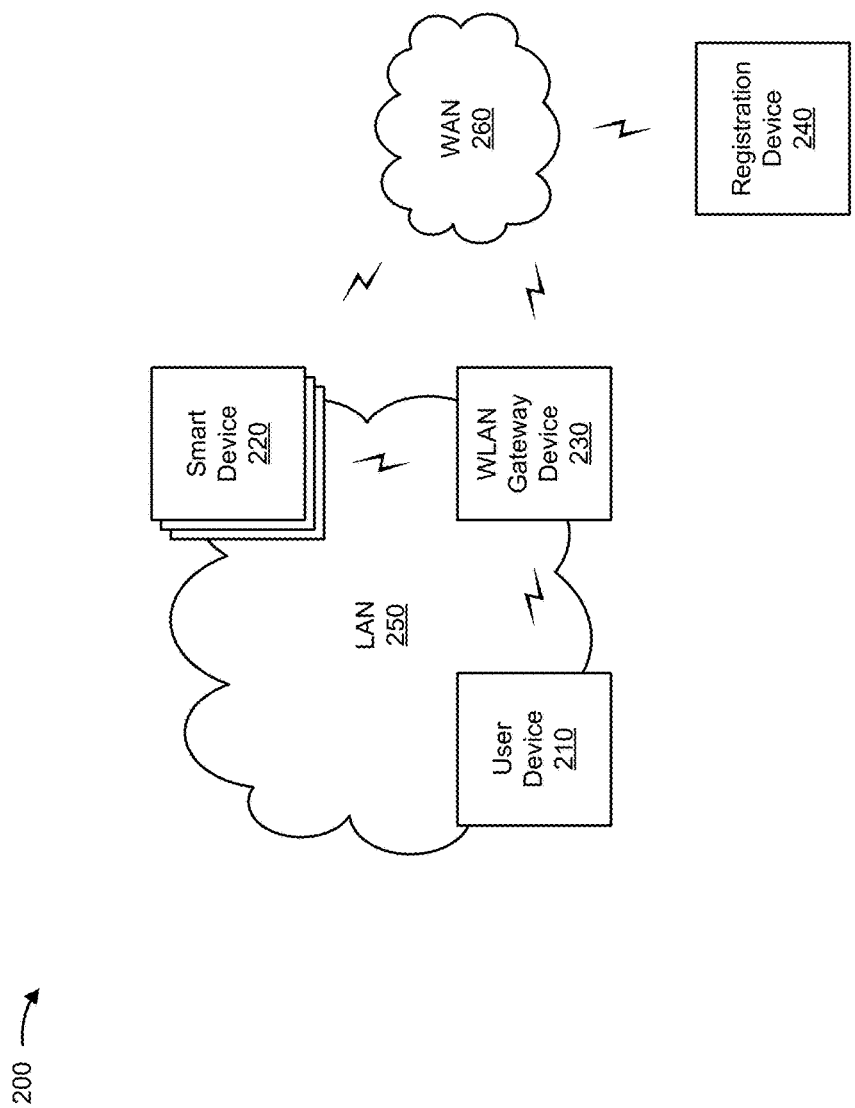
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, one or more smart devices 220, a wireless local area network (WLAN) gateway device 230, a registration device 240, a local area network (LAN) 250, and a WAN 260. Devices of environment 200 may interconnect via wired connections, wireless connections, or a combination of wired and wireless connections.

User device 210 includes one or more devices capable of receiving, generating, storing, processing, and/or providing information associated with registering smart device(s) 220 with registration device 240. For example, user device 210 may include a communication and/or computing device, such as a mobile phone (e.g., a smart phone, a radiotelephone, etc.), a laptop computer, a tablet computer, a handheld computer, a personal gaming device, a wearable communication device (e.g., a smart wristwatch or a pair of smart eyeglasses), or a similar type of device. In some implementations, user device 210 may assist with registering smart device 220, as described in more detail elsewhere herein.

Smart device 220 includes one or more machine-to-machine (M2M) devices and/or one or more Internet of Things (IoT) devices capable of receiving, generating, processing, and/or providing information associated with registering smart device 220 with registration device 240. For example, smart device 220 may include a thermostat, a light bulb, a garage door opener, a light switch, a smoke detector, a home security system, a door lock, an oven, a refrigerator, a microwave, a stove, a medical device, a biometric device, a vehicle, and/or a similar type of device. In other words, smart device 220 may be any "thing" in the Internet of Things (IoT). In some implementations, smart device 220 may register with registration device 240, with the assistance of user device 210, as described in more detail elsewhere herein.

WLAN gateway device 230 includes one or more devices capable of communicating wirelessly with local devices, such as user device 210 and/or smart device 220, and providing connectivity, for local devices, to devices connected to LAN 250 and/or WAN 260 (e.g., registration device 240). For example, WLAN gateway device 230 may include a gateway, a WLAN access point, a router, modem, a switch, a hub, a bridge, or a similar type of device. WLAN gateway device 230 may enable user device 210 and/or smart device 220 to connect to and/or communicate with registration device 240 (e.g., via LAN 250 and/or WAN 260).

Registration device 240 includes one or more devices capable of registering smart device 220 for use with one or more services. For example, registration device 240 may include a server (e.g., a registration server, a cloud server, or another type of server) and/or a similar type of device.

LAN 250 includes one or more wired and/or wireless networks. For example, LAN 250 may include a LAN and/or a WLAN (e.g., a Wi-Fi network), a private network, an ad hoc network, an intranet, and/or a combination of these or other types of networks. In some implementations, user device 210 may access LAN 250 via WLAN gateway device 230, and may communicate with smart device 220 and/or registration device 240 via LAN 250.

WAN 260 includes one or more wired and/or wireless networks. For example, WAN 260 may include a cellular network (e.g., an LTE network, a 3G network, a code division multiple access (CDMA) network, etc.), a PLMN, a WAN, a MAN, a telephone network (e.g., a PSTN), a private network, an ad hoc network, an intranet, the Internet, a fiber optic-based network, a cloud computing network, and/or a combination of these or other types of networks. In some implementations, user device 210 and/or smart device 220 may access WAN 260 and/or communicate with registration device 240 via WAN 260.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
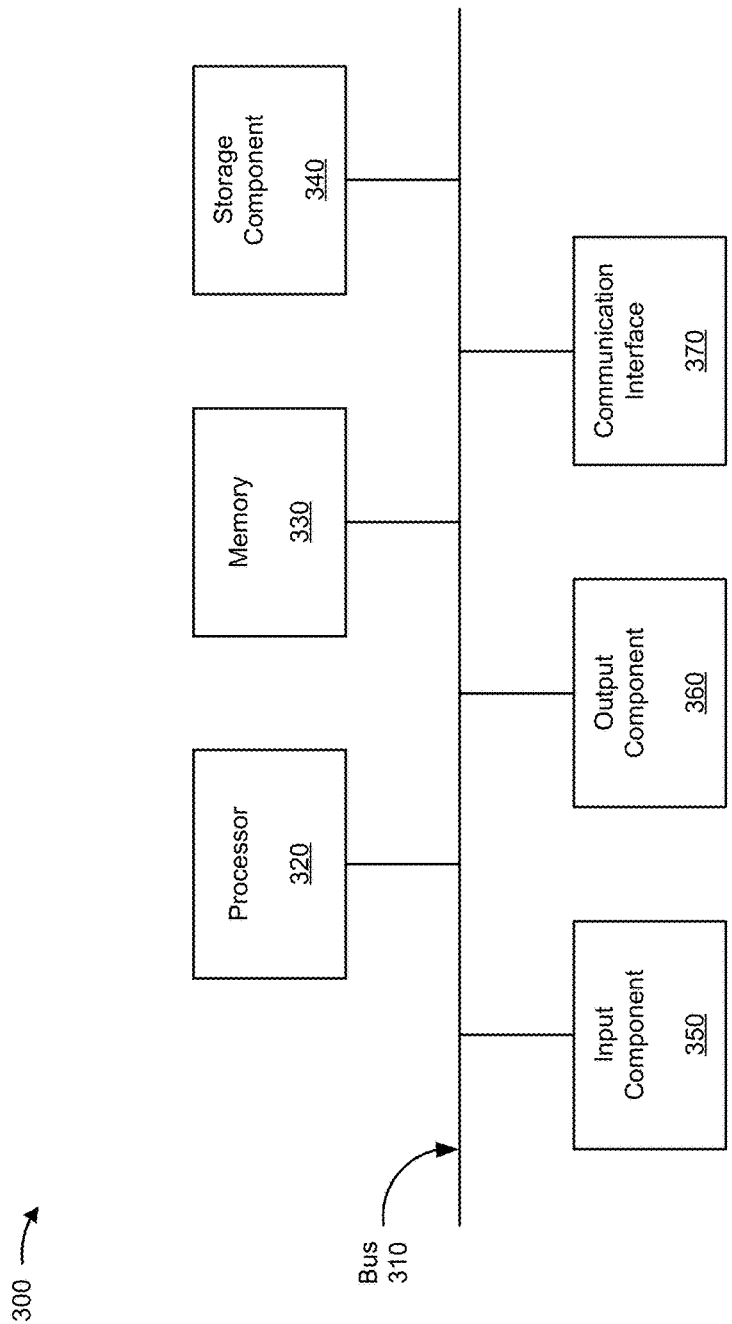
FIG. 3 is a diagram of example components of one or more devices of FIG. 2.

FIG. 3 is a diagram of example components of a device 300. Device 300 may correspond to user device 210, smart device 220, WLAN gateway device 230, and/or registration device 240. In some implementations, user device 210, smart device 220, WLAN gateway device 230, and/or registration device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for registering a smart device with a registration device using a multicast protocol. In some implementations, one or more process blocks of FIG. 4 may be performed by user device 210. In some implementations, one or more process blocks of FIG. 4 may be performed by another device or a group of devices separate from or including user device 210, such as smart device 220 and/or registration device 240.

As shown in FIG. 4, process 400 may include receiving an indication to request, for a smart device, a security key associated with registering the smart device with a registration device for use with a service, and transmitting, to the smart device, a first multicast message (block 410). For example, user device 210 may receive the indication from a user via a user interface associated with an application executing on the user device 210. In some implementations, the indication may indicate that the user wants to register one or more available smart devices 220 with registration device 240. For example, an available smart device 220 may include a smart device 220 that is in powered on, in communication with user device 210 and/or WLAN gateway device 230, or not registered with registration device 240.

In some implementations, the indication may indicate that the user wants to request a security key (e.g., a security identifier, a security token, or a digital certificate used for authentication) for an available smart device 220. In some implementations, user device 210 may receive the indication to request the security key in association with receiving an indication to register with registration device 240. In some implementations, smart device 220 may use the security key to register with registration device 240, which increases security when registering smart device 220 with registration device 240, as described below.

In some implementations, user device 210 may receive the indication without receiving an indication to register a particular smart device 220. For example, user device 210 may not have information about whether, or how many, smart devices 220 are available for registration and/or have not received security keys because user device 210 has not transmitted a first multicast message to discover the available smart devices 220.

In some implementations, user device 210 may receive an indication to register all available smart devices 220 and/or to request a security key for all available smart devices 220. For example, user device 210 may receive an indication to register and/or request a security key for all smart devices 220 not registered with registration device 240. In some implementations, when user device 210 has received an indication to register and/or request a security key for all available smart device 220, user device 210 may transmit a first multicast message to detect all smart devices 220 in communication with user device 210 and/or WLAN gateway device 230. For example, user device 210 may transmit a UDP discover message or a TCP discover message.

In some implementations, user device 210 may be configured to periodically register available smart devices 220 and/or periodically request security keys for available smart devices 220 (e.g., without receiving an indication from a user). In some implementations, when user device 210 is configured to periodically register smart devices 220 and/or request security keys, user device 210 may periodically transmit a first multicast message to detect all smart devices 220 in communication with user device 210 and/or WLAN gateway device 230. This conserves time for the user by not having to indicate that the user wants to register smart device 220 with registration device 240.

In some implementations, user device 210 may transmit the first multicast message to smart device 220 via WLAN gateway device 230. Additionally, or alternatively, user device 210 may transmit the first multicast message directly to all smart devices 220 in communication with user device 210 (e.g., via device-to-device communications). This conserves network resources of LAN 250 by having user device 210 transmit the first multicast message directly (e.g., rather than transmitting the first multicast message via WLAN gateway device 230).

In some implementations, all smart devices 220 in communication with WLAN gateway device 230 may have configured to receive multicast messages addressed to a multicast address. For example, all smart device 220 in communication with WLAN gateway device 230 may have configured an IP version four (IPv4) address or an IP version six (IPv6) address as the multicast address. In some implementations, user device 210 may transmit the first multicast message to the multicast address. Additionally, or alternatively, user device 210 may transmit the first multicast message to a particular port (e.g., a UDP port or a TCP port) associated with smart device 220. For example, user device 210 may transmit the first multicast message to TCP port XXX (e.g., where each X is a number from zero to nine).

In this way, user device 210 may use a first multicast message to detect all smart devices 220 in communication with user device 210 and/or WLAN gateway device 230.

As further shown in FIG. 4, process 400 may include receiving, from the smart device, a response that includes smart device information associated with connecting to the smart device (block 420). For example, user device 210 may receive UDP multicast responses from all smart devices 220 in communication with user device 210 and/or WLAN gateway device 230. In some implementations, user device 210 may receive responses regardless of whether any smart devices 220 are registered with registration device 240 and/or have received security keys.

In some implementations, the first response may include smart device information associated with connecting to smart device 220. For example, the smart device information may include information indicating an Internet protocol (IP) address of smart device 220, a MAC address of smart device 220, a brand and/or manufacturer of smart device 220, a model name and/or model number of smart device 220, a firmware version of smart device 220, a type of device of smart device 220 (e.g., a thermostat, a light switch, or an electrical outlet), and/or whether smart device 220 is already registered with registration device 240.

In some implementations, user device 210 may use the smart device information to determine whether particular smart devices 220 are available. For example, the smart device information may indicate whether particular smart devices 220 are registered with registration device 240 and/or have received security keys. In some implementations, user device 210 may use the smart device information to determine which smart devices 220 to register and/or to provide information to the user indicating the particular smart devices 220 that are available (e.g., to enable the user to select a particular smart device 220 to register, rather than registering all available smart devices 220). This conserves computing resources of user device 210 by preventing user device 210 from requesting a security key when the particular smart device 220 is already registered with registration device 240 and/or when the user does not desire to register the particular smart device 220.

As further shown in FIG. 4, process 400 may include transmitting, to the smart device, a second multicast message based on the smart device information, and establishing a connection with the smart device (block 430). For example, user device 210 may transmit a second multicast message, such as a UDP connection request message or a TCP connection request message, to smart device 220 to establish a connection with smart device 220. In some implementations, user device 210 may use the smart device information when transmitting the second multicast message.

In some implementations, the second multicast message may include smart device information received from a particular smart device 220 and associated with establishing a connection with the particular smart device 220. For example, the second multicast message may include an IP address of a particular available smart device 220 to which user device 210 is attempting to connect. In some implementations, the second multicast message may include user device information associated with establishing a connection to user device 210. For example, the second multicast message may include information indicating an IP address of user device 210, which smart device 220 may use to establish a connection with user device 210. As another example, the second multicast message may include information indicating a particular port of user device 210, via which smart device 220 may connect with user device 210.

In some implementations, user device 210 may transmit a single multicast message. For example, user device 210 may transmit a single multicast message when a user of user device 210 has selected a particular available smart device 220 to register with registration device 240. In some implementations, user device 210 may transmit multiple second multicast messages to all available smart devices 220. For example, user device 210 may transmit the second multicast messages to all available smart devices 220 when user device 210 receives an indication to register and/or request security keys for all smart devices 220 not registered with registration device 240.

In some implementations, user device 210 and smart device 220 may establish a connection using the smart device information and/or the user device information. For example, user device 210 and smart device 220 may establish the connection using the IP address and/or port information included in the smart device information and/or the user device information.

In some implementations, when user device 210 and smart device 220 establish a connection, user device 210 and smart device 220 may use a communication protocol when communicating. For example, user device 210 and smart device 220 may use a transport layer security (TLS) protocol when communicating, which increases security of communications between user device 210 and smart device 220 by using a communication protocol that provides communications security. In some implementations, user device 210 and smart device 220 may communicate using the particular communication protocol when communicating via a particular port. For example, user device 210 and smart device 220 may use the communication protocol when communicating via the particular port included in the second multicast message, as described below. This increases security of communications between user device 210 and smart device 220.

As further shown in FIG. 4, process 400 may include requesting and receiving the security key from the registration device (block 440). For example, user device 210 may determine that a particular smart device 220 is not already registered with registration device 240 (e.g., based on the smart device information). In some implementations, user device 210 may request that registration device 240 generate the security key based on determining that the particular smart device 220 is not already registered with registration device 240.

In some implementations, user device 210 may transmit authentication information to registration device 240 in association with requesting the security key for smart device 220. In some implementations, the authentication information, which may be associated with authenticating smart device 220, may include smart device information received from smart device 220. For example, the authentication information may include a brand of smart device 220, a model name and/or model number of smart device 220, and/or a firmware version of smart device 220.

Additionally, or alternatively, the authentication information may include information different from the smart device information. For example, the authentication information may include information indicating that the request for the security key is based on a user indication, which may be associated with a more secure request (e.g., relative to a request not associated with a user selection, such as a request generated periodically by user device 210). As another example, the authentication information may include information indicating that the request for the security key is based on a request to register all available smart devices 220, which may be associated with a less secure request (e.g., relative to a request for a particular smart device 220).

In some implementations, registration device 240 may use the authentication information to authenticate smart device 220. For example, registration device 240 may use the authentication information to authenticate that smart device 220 is a smart device 220 for which registration device 240 is permitted to generate a security key. In some implementations, registration device 240 may compare the authentication information received from user device 210 and a stored set of authentication information to authenticate smart device 220. In some implementations, when the comparison indicates a match, registration device 240 may authenticate smart device 220 and generate the security key for smart device 220. Additionally, or alternatively, registration device 240 may request that a different device (e.g., a device other than registration device 240) generate the security key when registration device 240 authenticates smart device 220 using the authentication information.

In some implementations, user device 210 may provide an application certificate (e.g., a security identifier, a security token, or a digital certificate) to registration device 240 when requesting the security key. In some implementations, registration device 240 may use the application certificate to authenticate the request for the security key. In some implementations, the application certificate may be associated with authenticating user device 210 and/or a particular application associated with user device 210. For example the application certificate may be associated with authenticating the particular application via which the user requested registration of smart device 220.

In some implementations, registration device 240 may use the application certificate to authenticate that the request to generate the security key is being transmitted from a particular user device 210 and/or an application permitted to request the security key. For example, registration device 240 may compare the received application certificate and a stored set of application certificates to authenticate user device 210 and/or the particular application. In some implementations, when the comparisons indicate a match, registration device 240 may authenticate user device 210 and/or the particular application and generate the security key. Additionally, or alternatively, registration device 240 may request that a different device (e.g., a device other than registration device 240) generate the security key when registration device 240 authenticates user device 210 and/or the particular application using the application certificate.

In some implementations, registration device 240 may generate a security key that is available for a threshold amount of time (e.g., a limited amount of time). For example, registration device 240 may generate a security key that smart device 220 has to use within 24 hours. In this case, if smart device 220 does not use the security key to register with registration device 240 within 24 hours, smart device 220 may not be permitted to register with registration device 240 using the security key and user device 210 may have to request a different security key for smart device 220.

In some implementations, user device 210 may receive the security key from registration device 240 when registration device 240 generates and provides the security key. In some implementations, user device 210 may receive the security key from a different device (e.g., a device other than registration device 240). For example, user device 210 may receive the security key when registration device 240 directs the different device to generate the security key after registration device 240 has performed the authentication.

In this way, security is increased when requesting a security key by having user device 210 provide authentication information and/or an application certificate that can be used to authenticate user device 210, smart device 220, and/or an application associated with requesting the security key.

As further shown in FIG. 4, process 400 may include providing the security key to the smart device to permit the smart device to register with the registration device (block 450). For example, user device 210 may provide the security key to smart device 220 via WLAN gateway device 230 and/or directly to smart device 220 (e.g., via device-to-device communications). In some implementations, user device 210 may provide the security key to smart device 220 via the connection established between user device 210 and smart device 220 (e.g., by using a transmission control protocol/internet protocol (TCP/IP) message, rather than a multicast message).

In some implementations, user device 210 may provide connection information to smart device 220 in association with providing the security key. For example, user device 210 may provide connection credentials, account credentials, or network credentials, such as usernames and/or passwords, to smart device 220. In some implementations, smart device 220 may use the connection information to connect to WAN 260. This increases security when smart device 220 is connecting to WAN 260 by preventing smart device 220 from connecting to WAN 260 unless smart device 220 provides the connection information.

In some implementations, registration device 240 may receive the security key and/or the connection information from smart device 220 (e.g., via WLAN gateway device 230). In some implementations, registration device 240 may compare the security key and a stored set of security keys to determine whether to permit smart device 220 to register with registration device 240. In addition, registration device 240 may compare the connection information and a stored set of connection information to determine whether to permit smart device 220 to connect to WAN 260. In some implementations, when the comparisons indicate a match, registration device 240 may permit smart device 220 to register with registration device 240 and/or to connect to WAN 260.

In some implementations, when smart device 220 is permitted to register with registration device 240, smart device 220 and registration device 240 may communicate directly (e.g., without communicating via user device 210). In some implementations, a service provider (e.g., a network operator of WAN 260) may provide services to smart device 220 and/or user device 210. For example, the services may permit a user of user device 210 to control smart device 220 via user device 210 (e.g., by providing user device 210 with remote access to smart device 220).

As another example, the service provider may collect data from smart device 220, such as data consumption statistics, power consumption statistics, user habit statistics, or any data that smart device 220 collects (e.g., environmental data), and provide a user of user device 210 with access to the statistics (e.g., via an application executing on user device 210). As yet another example, the user may use a single application to access the services and/or control smart device 220, which may conserve computing resources and/or time for the user by reducing and/or eliminating the need to use multiple applications to access multiple services and/or control multiple smart devices 220.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
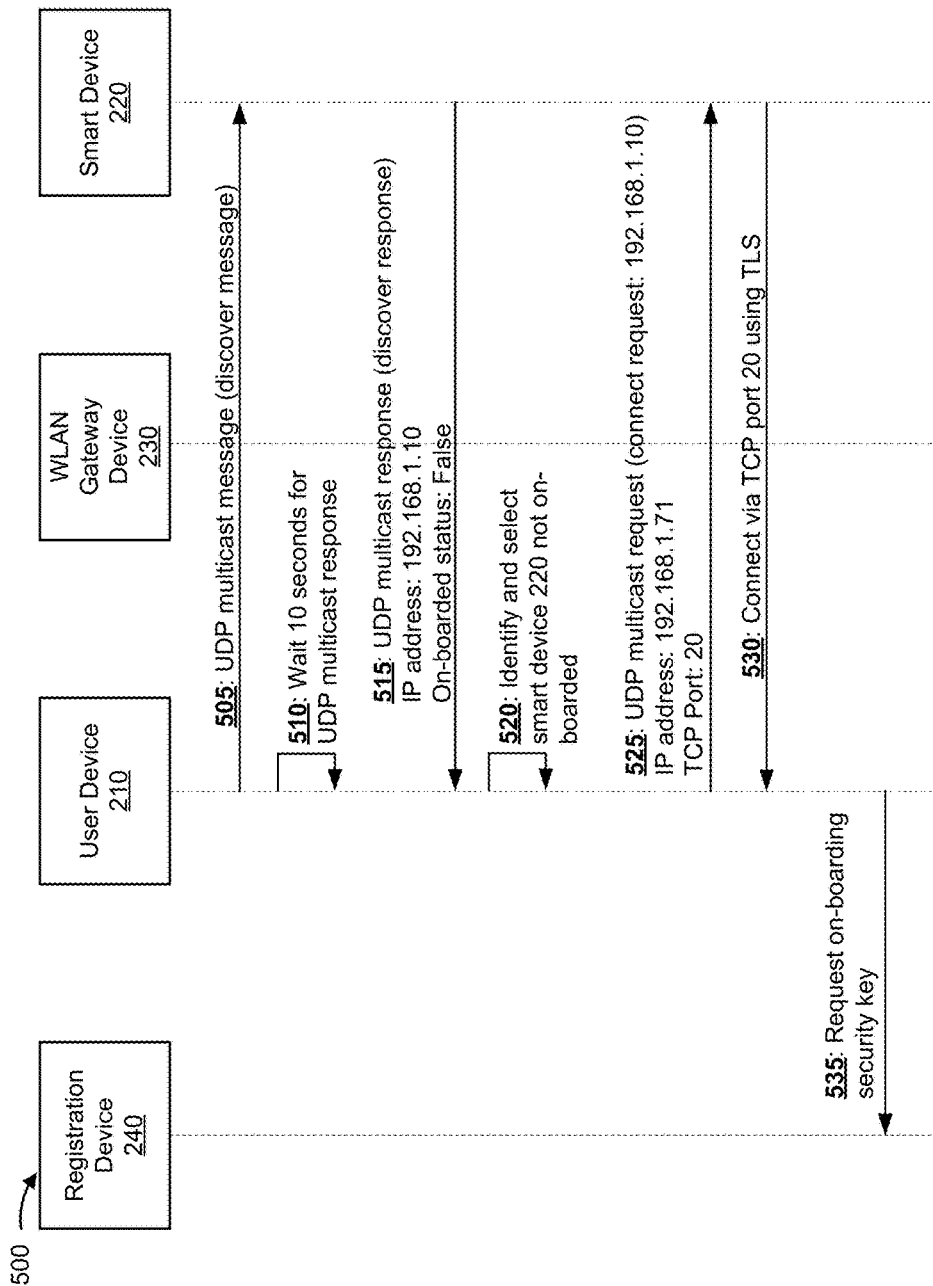
FIGS. 5A and 5B are call flow diagrams of example call flows relating to the example process shown in FIG. 4.
Figure 5B:
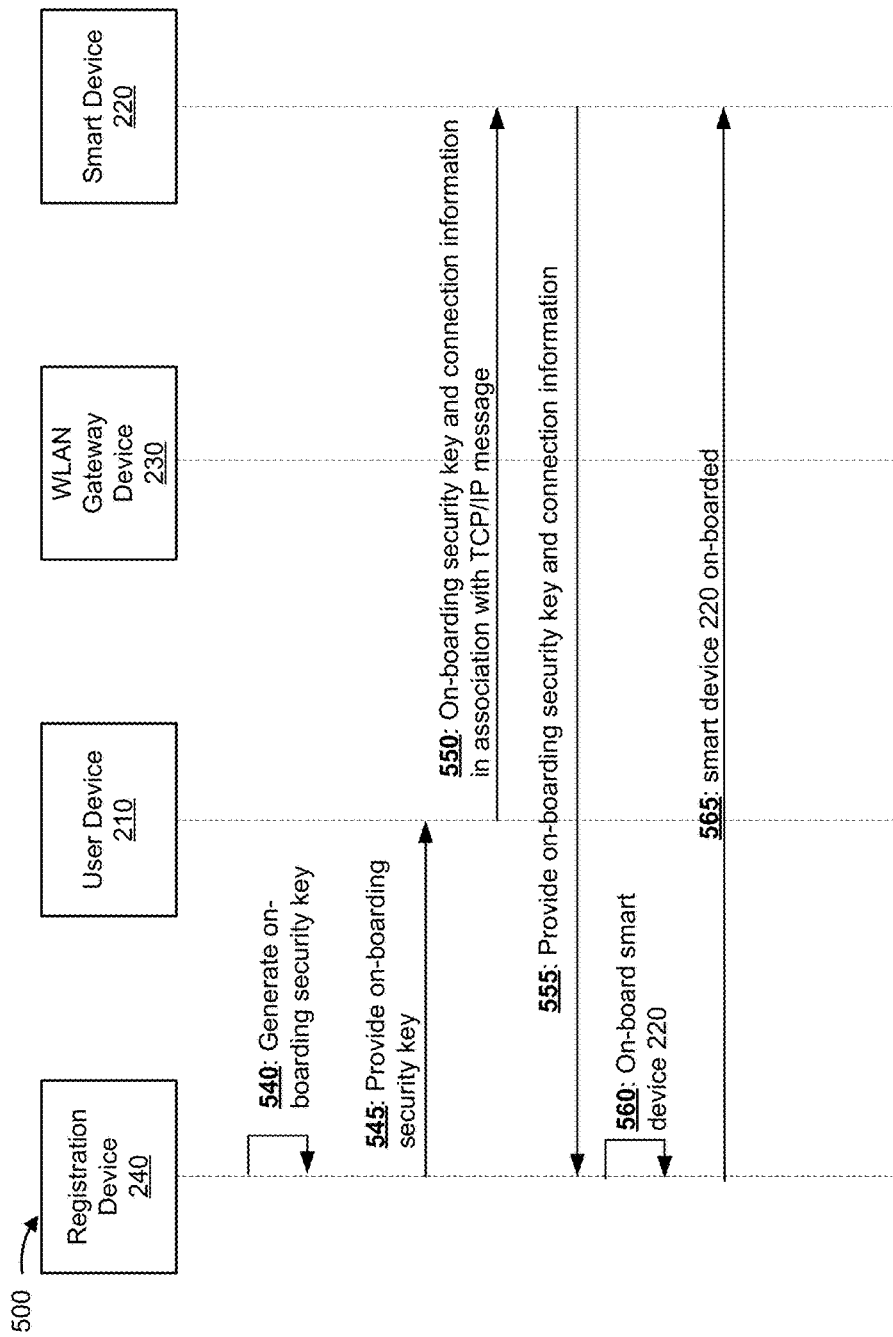

FIGS. 5A and 5B are a call flow diagram of an example call flow 500 relating to example process 400, shown in FIG. 4. FIGS. 5A and 5B show an example of registering smart device 220 with registration device 240 using a multicast protocol. In some implementations, one or more process blocks of FIGS. 5A and 5B may be performed by user device 210, smart device 220, WLAN gateway device 230, and/or registration device 240. Additionally, or alternatively, one or more process blocks of FIGS. 5A and 5B may be performed by another device or a group of devices separate from or including user device 210, smart device 220, WLAN gateway device 230, and/or registration device 240.

Assume, for example, that user device 210 has an IP address of 192.168.1.71 and that smart device 220 has an IP address of 192.168.1.10. In addition, assume, for example, that both user device 210 and smart device 220 have joined an IP multicast group 225.39.55.123, by which user device 210 and smart device 220 may transmit and/or receive UDP multicast messages. Further, assume, for example, that WLAN gateway device 230 is configured to permit UDP multicast messages. As shown in FIG. 5A, and by reference number 505, user device 210 may transmit a UDP multicast message (e.g., a UDP discover message) to smart device 220. In some implementations, user device 210 may transmit the message via WLAN gateway device 230 to all smart devices 220 in communication with WLAN gateway device 230 (e.g., by transmitting the UDP multicast message to the IP multicast group).

As shown by reference number 510, user device 210 may wait a threshold amount of time (e.g., 10 seconds) for a UDP multicast response from smart device 220 to the UDP multicast message. In some implementations, when user device 210 does not receive a UDP multicast response (e.g., within the threshold amount of time), user device 210 may retransmit the UDP multicast message.

As shown by reference number 515, smart device 220 may transmit the UDP multicast response (e.g., a UDP discover response) to user device 210 in response to the UDP multicast message. In some implementations, the UDP multicast response may include information that indicates an IP address of smart device 220 and/or whether smart device 220 has been on-boarded (e.g., registered with registration device 240). For example, the UDP multicast message may include information that indicates that the IP address of smart device 220 is 192.168.1.10 and that the on-boarded status of smart device 220 is false (e.g., shown as "On-boarded status: False"), indicating that smart device 220 has not been on-boarded.

As shown by reference number 520, user device 210 may identify and select a particular smart device 220 that has not been on-boarded, so that user device 210 may request a security key for the particular smart device 220. For example, user device 210 may identify a particular smart device 220 with an on-boarded status of false. As shown by reference number 525, user device 210 may transmit a UDP multicast request (e.g., a UDP connect request) to smart device 220. In some implementations, the UDP multicast request may include the IP address of the particular smart device 220 selected for on-boarding (e.g., shown as "192.168.1.10"). In some implementations, the UDP multicast request may include the IP address of user device 210 transmitting the UDP multicast request (e.g., shown as "192.168.1.71"). Additionally, or alternatively, the UDP multicast request may identify a TCP port of user device 210, via which user device 210 and smart device 220 may connect (e.g., shown as "20").

As shown by reference number 530, smart device 220 may connect to user device 210 via TCP port 20 using a transport layer security (TLS) protocol. In some implementations, user device 210 may use the connection to smart device 220 to provide the security key, as described below. As shown by reference number 535, user device 210 may request an on-boarding security key (e.g., a security key used to register smart device 220 to registration device 240) from registration device 240. In some implementations, user device 210 may request the on-boarding security key from registration device 240 before, or in association with, connecting to smart device 220. In some implementations, user device 210 may provide authentication information and/or an application certificate to registration device 240 in association with requesting the on-boarding security key.

As shown in FIG. 5B, and by reference number 540, registration device 240 may generate the on-boarding security key for smart device 220 to use to register with registration device 240. For example, registration device 240 may generate the security key after authenticating user device 210 and/or smart device 220 using the authentication information and/or the application certificate.

As shown by reference number 545, registration device 240 may provide the on-boarding security key to user device 210 when registration device 240 generates the on-boarding security key. As shown by reference number 550, user device 210 may provide the on-boarding security key to smart device 220 in association with transmitting a TCP/IP message to smart device 220. In some implementations, user device 210 may provide connection information to smart device 220 in association with providing the on-boarding security key, which smart device 220 may use to connect to WAN 260 to access services.

As shown by reference number 555, smart device 220 may provide the security key and/or the connection information to registration device 240 for on-boarding and connecting to WAN 260. In some implementations, smart device 220 may provide the security key and/or the connection information directly to registration device 240 (e.g., without providing the security key and/or the connection information via WLAN gateway device 230). As shown by reference number 560, registration device 240 may on-board smart device 220. For example, registration device 240 may on-board smart device 220 by authenticating the security key provided by smart device 220. As another example, registration device 240 may authenticate the connection information and permit smart device 220 to connect to WAN 260.

As shown by reference number 565, registration device 240 may provide an indication to smart device 220 that smart device 220 has been on-boarded. In some implementations, when smart device 220 is on-boarded, registration device 240 may provide services to smart device 220 and/or provide services associated with smart device 220 to user device 210 (e.g., services that permit a user of user device 210 to control smart device 220).

As indicated above, FIGS. 5A and 5B are provided merely as an example. Other examples are possible and may differ from what was described with regard to FIGS. 5A and 5B.

Implementations described herein may enable a user device to use a multicast protocol to register smart devices, associated with different brands and/or manufacturers, with a registration device. This may enable a user of the user device to register the smart devices and/or control the smart devices using a single application associated with the user device. This conserves computing and/or processor resources of the user device by reducing and/or eliminating the need for the user device to download, store, and execute different applications for connecting smart devices associated with different brands and/or manufacturers. In addition, implementations described herein may enable a service provider to provide services to the smart devices (e.g., rather than different service provider associated with the different brands and/or manufacturers providing services). This increases an efficiency of providing services to the smart devices by having a service provider provide the services to the smart devices.

Further, implementations described herein may enable the user device to register the smart devices with the registration device using a security key. This increases security of registering the smart devices with the registration device by authenticating the smart devices prior to registering the smart devices.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, or equal to the threshold.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
 a memory; and
 one or more processors to:
  receive an indication to request security information for a first device,
   the security information corresponding to registering the first device with a registration device for use with a service;
  transmit one or more first point-to-multipoint messages to the first device and a second device,
   the one or more first point-to-multipoint messages are multicast discover messages;
  receive a first response from the first device and a second response from the second device based on transmitting the one or more first point-to-multipoint messages,
   the first response including first device information for connecting to the first device and the second response including second device information for connecting to the second device;
transmit, to the first device and the second device, one or more second point-to-multipoint messages based on the first device information and the second device information;
request and receive the security information from the registration device; and
provide the security information to the first device to permit the first device to register with the registration device.

2. The device of claim 1, where the one or more processors, when requesting the security information, are to:
determine a registration status of the first device with the registration device; and
request the security information based on determining the registration status of the first device.

3. The device of claim 1, where the one or more processors, when providing the security information, are to:
provide the security information using a transmission control protocol/internet protocol (TCP/IP) message.

4. The device of claim 1, where the first device information includes:
an internet protocol (IP) address of the first device, or
a media access control (MAC) address of the first device.

5. The device of claim 1, where the security information includes:
a security key,
a security identifier,
a security token, or
a digital certificate.

6. A method, comprising:
transmitting, by a device and to a first device and a second device, one or more first point-to-multipoint messages to determine whether to request security information,
the one or more first point-to-multipoint messages are multicast discover messages;
the security information corresponding to permitting the first device and the second device to register with a registration device;
receiving, by the device and from the first device, a first point-to-multipoint response that includes first device information for connecting to the first device;
receiving, by the device and from the second device, a second point-to-multipoint response that includes second device information for connecting to the second device;
transmitting, by the device and to the first device and the second device, one or more second point-to-multipoint messages based on the first device information and the second device information;
requesting and receiving, by the device, the security information from the registration device; and
providing, by the device, the security information to the first device to permit the first device to register with the registration device.

7. The method of claim 6, where providing the security information comprises:
providing connection information to the first device to permit the first device to register with the registration device.

8. The method of claim 6, further comprising:
determining that the first device information, received in association with the first point-to-multipoint response, includes information that indicates a registration status of the first device with the registration device; and
determining to request the security information based on the registration status of the first device.

9. The method of claim 6, further comprising:
providing, to the registration device, authentication information,
the authentication information identifying:
an internet protocol (IP) address of the first device,
a media access control (MAC) address of the first device,
a brand of the first device,
a manufacturer of the first device,
a model name of the first device,
a model number of the first device,
a firmware version of the for the first device, or
a type of device of the first device.

10. The method of claim 6, where:
the device is a user device, and
the first device is a smart device.

11. A non-transitory computer-readable medium storing instructions, the instructions comprising:
one or more instructions that, when executed by one or more processors, cause the one or more processors to:
receive an indication to request security information for a first device,
the security information corresponding to registering the first device with a registration device for use with a service;
transmit one or more first point-to-multipoint messages to the first device and a second device,
the one or more first point-to-multipoint messages are multicast discover messages;
receive a first response from the first device based on transmitting the one or more first point-to-multipoint messages,
the first response including first device information for connecting to the first device;
receive a second response from the second device based on transmitting the one or more first point-to multipoint messages,
the second response including second device information for connecting to the second device;
transmit, to the first device and the second device, one or more second point-to-multipoint messages based on the first device information and the second device information;
request and receive the security information from the registration device; and
provide the security information to the first device to permit the first device to register with the registration device.

12. The non-transitory computer-readable medium of claim 11, where the one or more instructions, that cause the one or more processors to request the security information, cause the one or more processors to:
determine a registration status of the first device with the registration device; and
request the security information based on determining the registration status of the first device.

13. The non-transitory computer-readable medium of claim 11, where the one or more instructions, that cause the one or more processors to provide the security information, cause the one or more processors to:
provide the security information using a transmission control protocol/internet protocol (TCP/IP) message.

14. The non-transitory computer-readable medium of claim 11, where the first device information includes:
   an internet protocol (IP) address of the first device, or
   a media access control (MAC) address of the first device.

15. The non-transitory computer-readable medium of claim 11, where the security information includes:
   a security key,
   a security identifier,
   a security token, or
   a digital certificate.

16. The device of claim 1, where the security information includes:
   a security key,
      the security key being available for a threshold amount of time.

17. The non-transitory computer-readable medium of claim 11, where the one or more instructions further cause the one or more processors to:
   request and receive additional security information for the second device from the registration device; and
   provide the additional security information to the second device to permit the second device to register with the registration device.

18. The device of claim 1, where the one or more processors are further to:
   transmit authentication information to the registration device to authenticate the first device.

19. The method of claim 6, where transmitting the one or more second point-to-multipoint messages comprises one or more of:
   transmitting one or more of:
      a user datagram protocol (UDP) connection request message, or
      a transmission control protocol (TCP) connection request message.

20. The non-transitory computer-readable medium of claim 11, where the one or more instructions further cause the one or more processors to:
   transmit authentication information to the registration device to authenticate the first device.

* * * * *